（12) United States Patent
Twomey (10) Patent No.: US 7,340,564 B2
(45) Date of Patent: Mar. 4, 2008

(54) TRACING INSTRUCTION FLOW IN AN INTEGRATED PROCESSOR

(75) Inventor: John E. Twomey, Bedford, MA (US)

(73) Assignee: Broadcom Corporation, Irvine, CA (US)

( * ) Notice: Subject to any disclaimer, the term of this patent is extended or adjusted under 35 U.S.C. 154(b) by 467 days.

(21) Appl. No.: 10/925,491

(22) Filed: Aug. 25, 2004

(65) Prior Publication Data
US 2006/0095674 A1    May 4, 2006

(51) Int. Cl.
*G06F 12/00* (2006.01)
(52) U.S. Cl. ......................................... 711/125; 714/45
(58) Field of Classification Search .................. 711/118
See application file for complete search history.

(56) References Cited

U.S. PATENT DOCUMENTS 4,357,656 A * 11/1982 Saltz et al. .................. 711/138
5,636,363 A * 6/1997 Bourekas et al. ........... 711/138

* cited by examiner

*Primary Examiner*—Matthew Kim
*Assistant Examiner*—Ryan Dare
(74) *Attorney, Agent, or Firm*—Garlick Harrison & Markison (57) ABSTRACT

Tracing instruction flow in an integrated processor by defeaturing a cache hit into a cache miss to allow an instruction fetch to be made visible on a bus, which instruction would not have been made visible on the bus had the instruction fetch hit in the cache. The defeature activation is controlled by use of a defeature hit signal bit in a defeature register, and in which the bit may be programmed.

10 Claims, 5 Drawing Sheets

TRACING INSTRUCTION FLOW IN AN INTEGRATED PROCESSOR

BACKGROUND OF THE INVENTION

1. Technical Field of the Invention

The embodiments of the invention relate to performing diagnostics on an integrated circuit and, more particularly, to a scheme to trace instruction flow in an integrated processor.

2. Description of Related Art

Historically, microprocessors were non integrated devices, where a system bus was exposed and connected to support logic that contained a memory controller to control main memory (such as a random-access-memory or RAM) and program memory (such as a programmable read-only memory or PROM). This simpler design allowed a logic analyzer to be placed on a processor bus and the address bus accesses could be monitored and/or captured, along with decoding control signals indicating an instruction fetch, to trace an instruction or a program counter. The analyzer could be stopped and a user could look back in the trace and determine program flow.

Tracing instruction or program flow is helpful in debugging a program running on a processor. Typically, it is helpful to know where the program counter (PC) points in order to correctly associate high level source code. Tracing instruction fetches allow a captured history of where the code has executed from and how it may have reached the present instruction. This is often helpful and sometimes necessary in order to remove programming errors.

However, with the advent of integrated processors, many of these integrated circuits ("chips") now include at least one level of cache memory (typically referred to as a Level 1 (L1) cache) on the processor chip. In some other integrated processor designs, secondary cache or caches may also be included on chip. For example, an integrated circuit which includes a complete system on chip (SOC), may have both L1 cache and a second level (L2) cache on chip. With such integration, not all instructions fetches are visible external to the processor, thereby presenting additional requirements to trace the instructions.

One of the desired requirements in debugging is to allow the processor to run at or near its real-time speed. Thus, substituting an emulator for the processor to debug is not always a viable solution, since emulators typically run much slower than the rated frequency of the processor itself. However when utilizing the integrated processor itself instead of an emulator, not all instruction fetches are visible externally, even with the use of special lines and pins to observe the functionality of the processor. For example, in an integrated processor utilizing an integrated L1 instruction cache, tracing may be obtained off of the system bus, but this set up only captures those instructions which miss in the L1 cache. To place some form of tracing unit or logic between the processor and the L1 cache to capture those instructions that hit in the L1 cache, may most likely result in a reduction in the maximum operating speed for the chip.

Accordingly, there is a need to obtain tracing of instructions (or program flow), including those instructions that hit in the L1 cache, and to obtain the tracing while the processor operates at or near real-time speed.

SUMMARY OF THE INVENTION

A scheme to trace instruction flow in an integrated processor by defeaturing a cache hit into a cache miss to allow an instruction fetch to be made visible on a bus. The instruction fetch would not have been visible on the bus under normal mode of operation if the instruction fetch hit in the cache. However, by defeaturing the cache hit, the processor accesses the bus to fetch the instruction and the fetching action is captured by the trace unit.

In one embodiment, a defeature hit signal bit in a defeature register is programmed to activate a defeature mode to disable the hit signal from an instruction cache. The instruction fetch is made visible on a system bus and captured by the trace unit. The trace unit may be set to trigger on certain events and to filter transactions as to capture only the desired transactions on the bus, which may be the instructions fetches. A trace buffer is used to store the captured information.

In one embodiment, the program flow tracing is used in performing diagnostics by having a test unit run programs, or having the actual code being debugged run, on a processor at or near processor operating frequency. The traced instruction flow is read out to provide information for debugging the system.

DETAILED DESCRIPTION OF THE EMBODIMENTS OF THE INVENTION

The embodiments of the present invention may be practiced in a variety of settings that implement a tracing unit to trace instructions on a bus. Typically, the bus resides opposite a cache from a side of the cache that is coupled to a processor core, so that cache hits are not registered on the bus and hence not traceable without the practice of the present invention. In one particular implementation, a defeature unit is utilized to disable cache hits and to ensure cache misses, so that instruction fetches are noted on the bus and captured by the tracing unit. Although particular examples are noted in the below embodiments, the invention may be practiced in various other forms as well.

Figure 1:
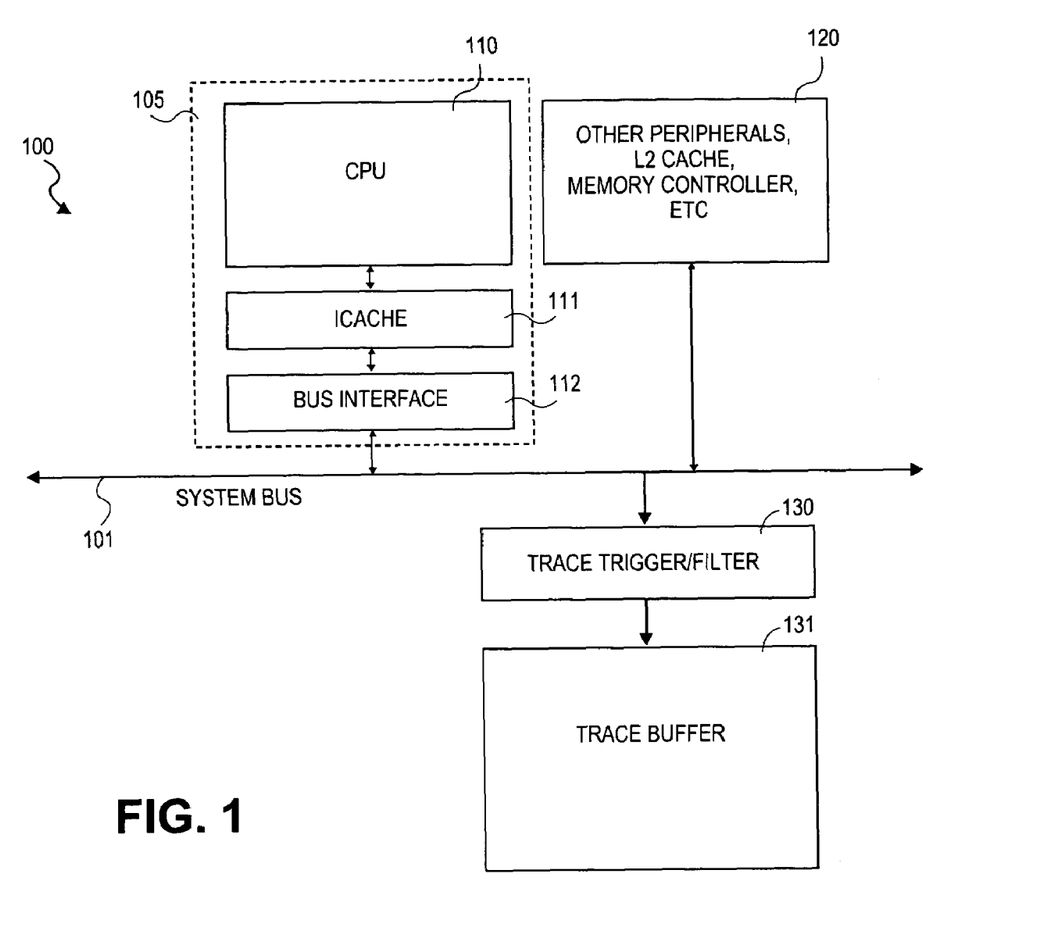
FIG. 1 is a block schematic diagram showing a system in which an embodiment of the invention is implemented within the system to defeature cache hits to allow tracing of instructions by making instructions visible on a system bus.

FIG. 1 shows an example system 100 that includes a processor unit 105. The processor unit may be referred to by various other names, including processor, microprocessor, processing chip, etc. For simplicity, unit 105 is referred to herein as processor 105. The example processor 105 is comprised of a processing core (noted as central processing unit, CPU) 110, an instruction cache 111 and bus interface 112. Various other units may be present in processor 105 to perform a number of functions, but only those units pertinent to the understanding of the invention are shown in processor 105 of FIG. 1. The various components of processor 105 are generally integrated within an integrated circuit chip.

Instruction cache (Icache) 111 is a cache memory that is utilized to cache instructions, including program counter values of the addresses of the instructions, that are executed on by CPU 110. An Icache is noted in the example, since many state of the art processors utilize separate caches for instructions and data. However, it is possible that in some embodiments cache 111 may be a single cache that caches both instructions and data. In this particular embodiment, Icache 111 is shown separate from a data cache (Dcache), as noted in FIG. 2. Furthermore, since Icache 111 is at a cache level closest to the CPU 110, it is generally referred to as a Level 1 (L1) Icache.

Bus interface 112 is utilized to interface processor 105 to other components external to processor 105. In the particular embodiment shown in FIG. 1, processor 105 is coupled to a system bus 101 through bus interface 112. Bus 101 is shown as a single bus, but in practice bus 101 may comprise a plurality of buses. For example, one bus may be utilized for address transfers and a second bus for data transfers. Still a third bus may be used for transfer of control signals. Various components, devices, circuits may also couple to bus 101. In FIG. 1, block 120 denotes some of these units that may couple to bus 101. For example, peripherals, a memory controller and a second level (L2) cache are noted in block 120 as units that may be coupled to bus 101.

Also shown coupled to bus 101 is a trace unit 130 utilized to trace signals on bus 101. In the example embodiment shown, trace unit 130 has a trigger and filter capability, which allows trace unit 130 to trigger on certain transactions (events) and/or filter tracing to capture certain transactions (events). In other embodiments, trace unit 130 may have other performance related characteristics for tracing or it may be a basic unit which traces all actions on the bus 101. Tracing signals on signal lines, such as a bus, is generally practiced to obtain diagnostic information, such as for debugging a chip. However, the use of tracing need not be limited only to debugging.

Information collected by trace unit 130 is stored in a trace buffer 131, which is coupled to trace unit 130. A variety of storage types may be used for trace buffer 131, including FIFOs (first-in, first-out) and circular buffers. Trace buffer 131 is utilized to store information captured by trace unit 130.

As noted above, components of processor 105 reside within an integrated circuit chip. One or more of the other components of system 100, including system bus 101, may reside in the same integrated circuit chip as the processor 105 or in separate integrated circuit chip(s). In one embodiment, which is shown later in FIG. 4, the various components of system 100 reside in the same integrated circuit chip and is referred to as a system-on-chip (SOC). In an SOC embodiment, bus 101 operates as an internal system bus.

When the Icache 111, or any other cache that may store instructions, is integrated with the CPU 110, it generally operates as a L1 cache. Instructions for execution by CPU 110 are read from wherever the particular program resides (typically in main memory, in mass storage or input/output peripherals) and cached in Icache 111. When CPU 110 fetches an instruction for execution, the Icache 111 typically contains the required instruction unless eviction or invalidity has occurred. Accordingly, a fair percentage or even high percentage of Icache 111 accesses by CPU 110 results in a cache "hit". A "miss" occurs if a valid instruction is not present in the cache.

In normal mode of operation, as the processor fetches the instructions, an Icache hit results in the processor obtaining the instruction from the Icache 111. When a cache miss occurs, the processor 105 fetches the valid instruction from wherever it resides. Thus, the instruction fetches that are visible to bus 101 are those that result from a cache miss. Fetches that hit in the cache are not visible on bus 101, since the instruction is obtained from the cache 111. Accordingly, a trace unit, such as trace unit 130, residing on bus 101 has the ability to capture the fetches that miss in Icache 111, but do not have the visibility to capture fetches that hit in Icache 111.

As noted in the background section above, replacing processor 105 is not an alternative if real-time operation of processor 105 is desired, since emulators generally operate at lower speed than the processor it is supposed to emulate. Similarly, placing a tracing unit or equivalent logic between the CPU 110 and Icache 111 to capture the fetches that hit in the Icache 111 may impact performance, since some slow-down of the processor may occur due to the presence of the added functionality. Further, this approach may require added silicon real estate on the chip to accommodate such special circuitry.

One advantage of having trace unit 130 on bus 101 is that various other activities on bus 101 may be captured and buffer 131 is not limited to storing only instructions for the CPU 110. Since trace units are helpful in debugging, a desirable location for the trace unit is a common point for capturing information, allowing one common trace unit to be used for various tracing functions. One such common location is bus 101 for trace unit 130 to reside.

In order to capture instructions fetches, whether it is a hit or a miss, one embodiment of the invention causes a cache hit to be treated as a miss when a particular defeature mode is activated. For example, when a particular test or diagnostic operation is to be performed, in which tracing of the instruction fetches are to be captured by trace unit 130, a defeature mode is entered into so that cache hits to Icache 111 are disabled and treated as cache misses. That is, in the defeature mode, instruction fetches from CPU 110 results in a cache miss, even if the valid instruction resides within Icache 111. Therefore, instruction fetches from CPU 110 in the defeature mode is made visible on bus 101, since the processor now accesses bus 101 to obtain the instruction from another location, instead of from Icache 111.

Figure 2:
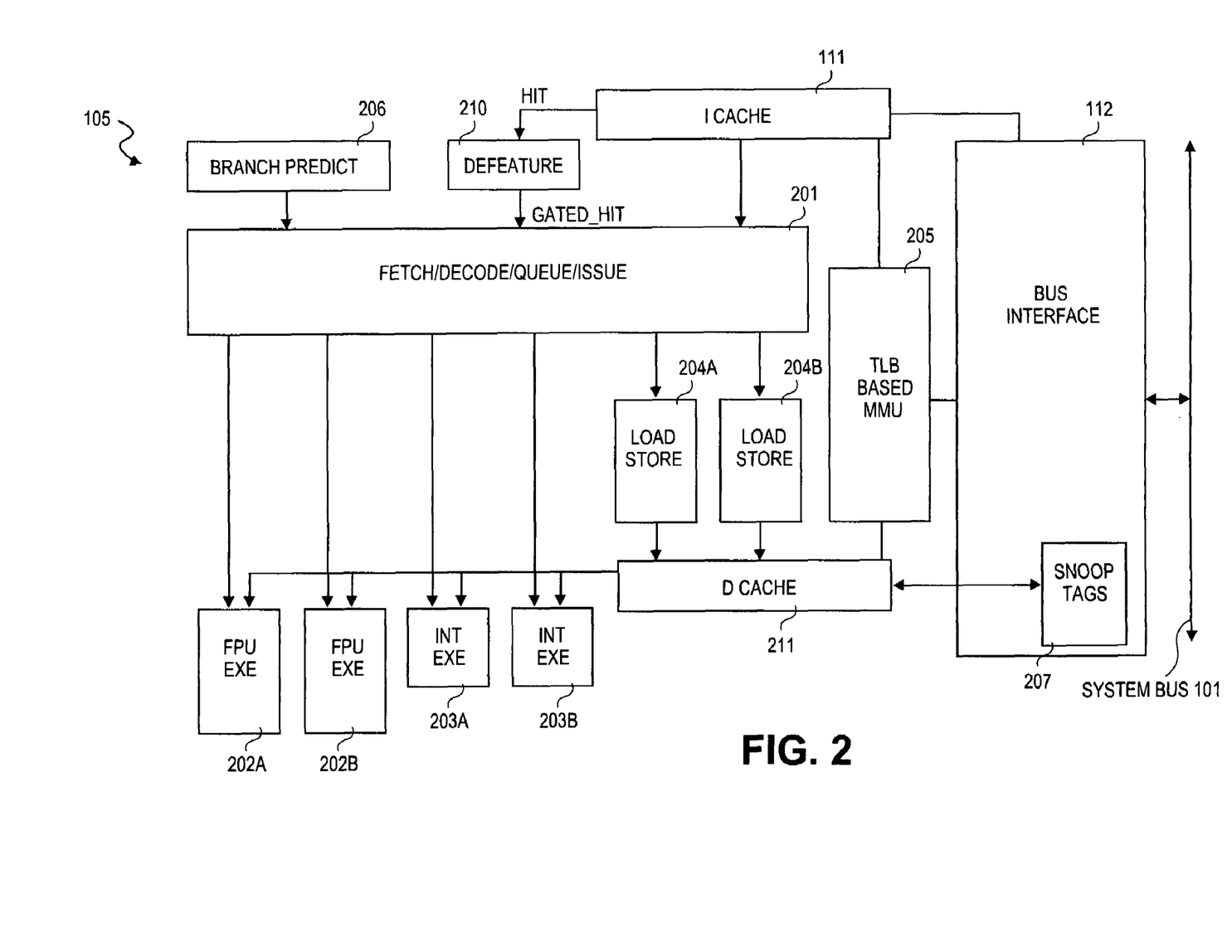
FIG. 2 is a block schematic diagram showing further details of a processor of FIG. 1, in which one embodiment of the invention is implemented by use of a defeature device to disable cache hits from an instruction cache.

A variety of techniques may be employed to treat a cache hit as a cache miss in Icache 111. Typically, such a mechanism may be employed in processor 105, although other locations may be possible. FIG. 2 illustrates one example embodiment of utilizing a defeature unit, in which the defeature unit is programmed to activate the defeature mode. When testing or debugging (or some other diagnostic) is to be performed to trace the instructions, the defeatured mode is entered into that causes cache hits to be defeatured (disabled and treated as cache misses), so that instruction fetches are made visible on system bus 101 for tracing by trace unit 130.

In FIG. 2, only the components of processor 105 and system bus 101 are shown. Furthermore, CPU 110 is shown comprised of various units 201-206. It is to be noted that the various component units of CPU 110 are shown as an example and that other embodiments may employ different units and designs for CPU 110. In the particular embodiment, CPU 110 includes a fetch/decode/queue/issue unit 201 to fetch, decode, queue and issue instructions to one or more of execution units 202A-B and 203A-B. Execution units 203A-B are integer units (INTs). Execution units 202A-B are floating point units (FPUs). One or more of floating point units 202 may include features to process extensions to an instruction set for a given architecture that allows enhanced processing of video, audio and/or graphics data manipulated by the processor. In one embodiment, one or more of the FPUs includes capability to execute digital media extensions, such as MIPS™ Digital Media Extensions (MDMX).

Load/store units 204A-B are employed to perform load (read) and store (write) operations on data, which may be cached in a data cache (Dcache) 211. A translation lookaside buffer (TLB) based memory management unit (MMU) 205 is used for translating the CPU's virtual address to a physical address used by the rest of the system. A branch predict unit 206 is present to perform program flow prediction in speculative operations. Also, a snoop tags unit 207, present in bus interface 112, may be used to allow snoops to the D-Cache to occur from other resources on the ZBbus without interfering with a CPUs access of its D-Cache. It is to be noted that operation of various units 201-207 are generally related to functionality of similar units in other processors. In one embodiment, Icache 111 is 32 KB in size.

In the embodiment of FIG. 2, processor 105 includes a defeature unit 210 to defeature a hit signal from Icache 111. The output from defeature unit 210 is noted as a gated_hit signal. This gated_hit signal is then coupled to fetch/decode/queue/issue unit 201. It is to be noted that although a single fetch/decode/queue/issue unit is shown, these functions may be separated into more than one unit. Furthermore, in many processors these operations are pipelined and possibly superscalar, so that more than one instruction is being processed in unit 201 at any given time. The gated_hit signal is sent to the fetch portion of unit 201 (or separate fetch unit in other processors) to indicate if there was an Icache hit (or miss) with the particular instruction being fetched.

In normal (non-defeatured) mode of operation, defeature unit 210 allows the hit signal to pass through to unit 201, indicating whether there was a hit or miss in the Icache 111 for the instruction being fetched. Thus, in the normal mode, the gated_hit signal is equivalent to the hit signal. When the defeatured mode is activated, such as when testing or debugging is being performed, defeature unit causes the hit signal to be disabled and treated as a miss, even if there is an actual hit in Icache 111. Accordingly, in the defeatured mode, the hit signal is defeatured and the gated_hit signal indicates a cache miss to unit 201, which then causes unit 201 to access bus 101 to fetch the valid instruction from another location instead of Icache 111. The cache miss indication causes the fetch to be visible on bus 101, which may then be captured by trace unit 130 of FIG. 1.

Figure 3:
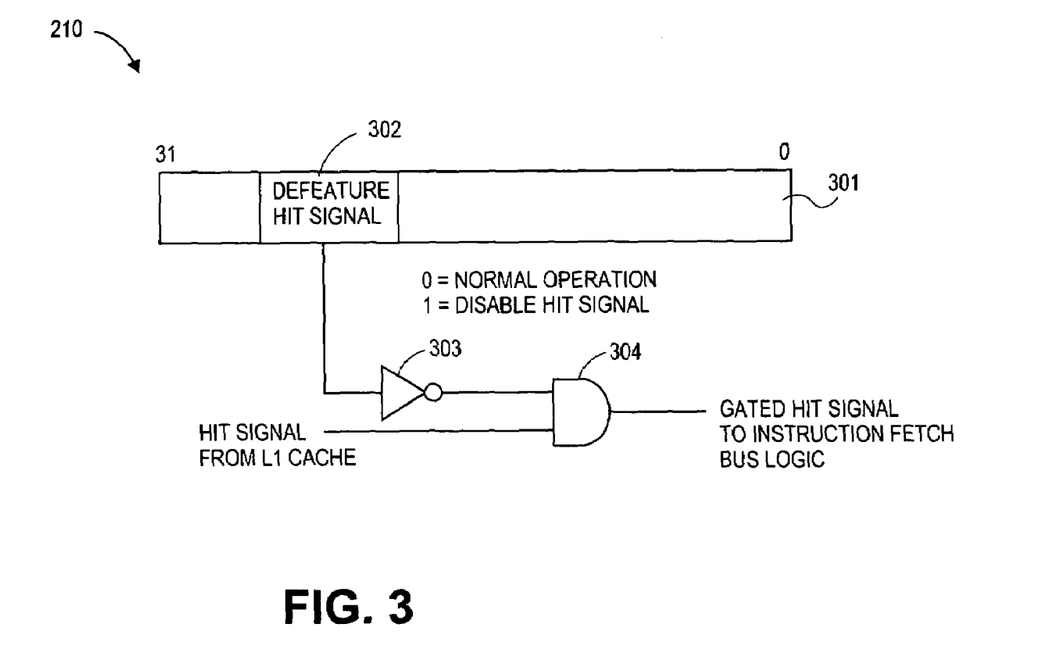
FIG. 3 is a schematic diagram showing one embodiment for implementing the defeature device of FIG. 2, in which a defeature register is used to program disabling of cache hits from the instruction cache.

A variety of techniques are available to defeature a cache hit signal to a cache miss signal. One embodiment to achieve the defeature of the cache hit is shown in FIG. 3. Defeature unit 210 is shown comprised of a defeature register 301 and associated logic represented by an inverter 303 and AND gate 304. Register 301 stores a defeature hit signal bit 302, which value determines if the defeature mode is activated. Defeature bit 302 is a single bit in this particular example, but other embodiments may use multiple bits. Register 301 is shown as a 32-bit register (bits 31:0), but the actual bit size of the register may vary. When using register 301, the other bits may be utilized for defeaturing or disabling various other functions of the processor 105.

In the particular example of FIG. 3, defeature hit signal bit 302 is used to defeature the Icache hit signal. Bit 302 has a value of logic '0' for normal operation and a value of '1' for the defeatured operation, which disables the hit signal from Icache 111. Bit 302 is coupled as an input to inverter 303 and the output of inverter 303 and the hit signal from the L1 Icache 111 are coupled as inputs to AND gate 304. The gated_hit signal is obtained at the output of AND gate 304. When in the normal mode of operation, bit 302 has a value of logic '0' to allow the hit signal to pass through to the output of AND gate 304. Thus, the gated_hit signal indicates a hit ('1') or a miss ('0') in the cache. When in the defeatured mode of operation, bit 302 has a value of logic '1' to force the output of AND gate 302 to be '0', indicating a miss. In this instance, a miss is always indicated, even if the Icache had sent a "1" hit signal.

The forcing of the hit/miss indication to a miss in the defeatured mode is made possible by the state of bit 302. When in normal mode of operation, bit 302 is set at '0'. However, whenever the defeatured mode is desired, bit 302 may be programmed to store a value of '1'. For example, when in a test mode, a tester or testing device may access register 301 and change the value of bit 302 to the defeature mode. In one embodiment, register 301 is a reserved register for the processor and is not a memory-mapped register, although other types of registers may be used. Since it is a reserved register, special op codes are used to write to the register and to set bit 302. As noted, register 301 may include other defeaturing bits to defeature or disable other processor functions.

As noted previously, a variety of tracing techniques may be employed for trace unit 130 of FIG. 1. In one embodiment, trace unit 130 includes a trigger/filter function, which is state driven, to perform a trace by triggering on one or more transactions or filter to trace or not trace certain transactions. For example, in one embodiment, trace unit 130 may be set to trigger only on instruction fetches or cycles that are used for instruction fetches. Furthermore, instruction fetches may be noted by monitoring control bits on bus 101 or monitoring for certain address range being accessed on address lines of bus 101, where those address ranges contain instructions. The captured information is stored in trace buffer 131. As noted earlier, trace buffer 131 may take a variety of forms. In one embodiment, trace buffer 131 is a circular buffer storing the last N number of entries. The contents of trace buffer 131 is read out when desired.

Figure 4:
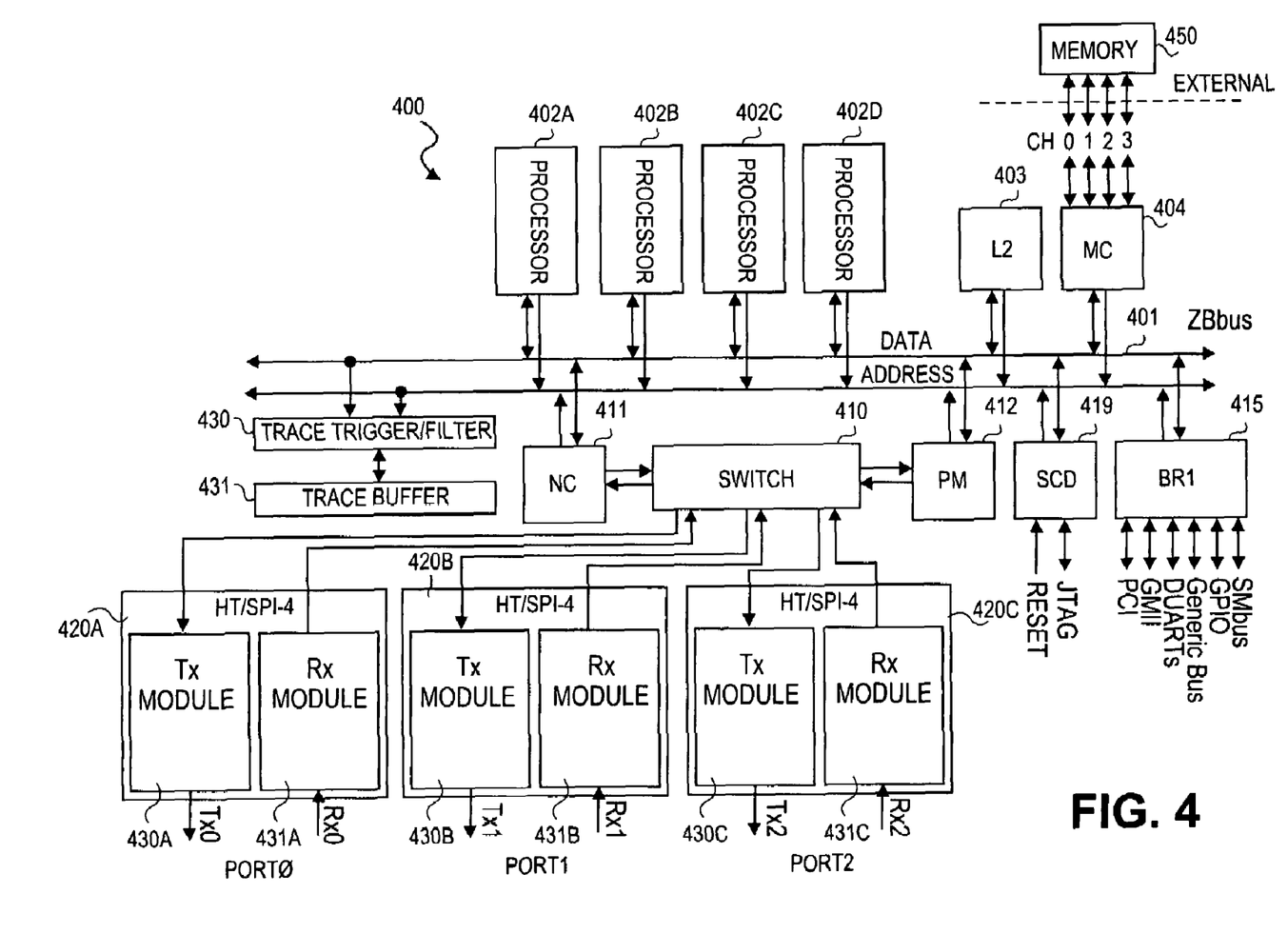
FIG. 4 is a block schematic diagram of a system on a chip (SOC) in which an embodiment of the invention is implemented in the SOC.

Referring to FIG. 4, an example processing device (referred to as a system 400) is illustrated in which a number of various units are coupled to one another through a bus. The various units of system 400 may be part of a single integrated circuit (IC) or the units may be embodied in separate ICs. In the particular embodiment of FIG. 4, the units shown may be constructed within a single IC so that the IC provides a complete system-on-a-chip (SOC) solution that includes one or more processors, memory controller, network, input/output (I/O) interface and data interface to provide a scalable, cache-coherent, distributed shared memory system. Thus, bus 401 (also referred to as a ZB bus) in the particular example is an internal system bus for the SOC, similar to system bus 101 of FIG. 1. The example system 400 is shown having four separate processors 402A-D. However, other embodiments of system 400 may operate with a single processor or any number of multiple processors. The example system 400 may operate in various applications including, packet processing, exception processing, switch control and management, higher layer of switching and filtering, application and computer servers, storage switches and systems, protocol conversion, and VPN (virtual private network) access, firewalls and gateways.

Other than the processors 402, system 400 includes a level 2 (L2) cache 403 to operate with a level 1 (L1) cache, which is present in individual processors 402 (similar to processor 105 of FIG. 1). Processors 402 and cache 403 are coupled to the ZB bus. System 400 also includes a memory controller 404, switch 410, node controller 411, a packet manager 412, a bridge unit 415 and a system controller and debug (SCD) unit 419. In FIG. 1, these various units may be regarded as included within block 120.

In the example system 400, processors 402 operate utilizing a particular instruction set architecture. Although the processors may be designed to operate utilizing the IA-32 or IA-64 instruction set architecture of Intel Corporation or the PowerPC™ instruction set, as well as others, processors 402 in the particular example comprise four low-power, superscaler 64-bit MIPS™ compatible processors with separate instruction and data caches. Processors 402 are coupled to the ZB bus 401, which in one embodiment is a high-performance, on-chip, cache-coherent internal bus. In one embodiment, the high-performance ZB bus operates as a 128 Gbps bus. The ZB bus is a cache-line wide (256 bits), split-transaction, cache-coherent bus which interconnects the various other units or modules shown in FIG. 4. In the particular embodiment, the ZB bus operates at half the processor core clock frequency for a bandwidth of 128 Gbps at 500 Megahertz. The bus has separate address, data, and control sections. The address and data sections are arbitrated separately to allow for a high bus utilization. The ZB bus supports a MESI protocol that helps maintain cache-coherency between the L1 caches, L2 cache and the I/O bridge, packet manager and node controller.

One or more of the processors 402 may be a quad issue, in order execution, processor that implements the MIPS™ 64 architecture. The processor core may include hardware support for floating-point processing and branch prediction (similar to those units in FIG. 2). The processor memory subsystem may include a 32 KB, 4-way associative, virtually-indexed and virtually-tagged instruction cache in a 32 KB, 4-way set associative, physically-indexed and physically-tagged data cache. In the particular embodiment, the cache line is 32 bytes wide. A bus interface unit within processor 402 couples the memory subsystem to the ZB bus and L2 cache 403 for main memory access and maintains cache coherency along with the ZB bus.

The L2 cache, which is also coupled to the ZB bus, may be a 1 MB on-chip second level cache that may be shared by the four processors. The L2 cache may also be shared by the node controller 411, packet manager 412 and any I/O DMA (direct memory access) master. In the particular embodiment, the L2 cache may be organized into 32-byte cache lines with 8-way set associativity. Accesses to the L2 cache may be in full cache blocks. The L2 cache may be a non-inclusive/non-exclusive cache, thus there are no restrictions on which cache blocks may be in the L2. A random replacement policy may be used when a victim line is to be found. The L2 cache may run internally at the CPU core speed and may be fully pipelined. The L2 cache may be physically one of the ZB bus agents, but architecturally the L2 cache sits between the system bus and the main memory and there may be dedicated signals between the L2 and memory controller 104. In an alternative embodiment, aside for the normal operation of the L2 cache, a mode may exist where banks of the L2 cache may be used as an on-chip SRAM (static random access memory).

Memory controller (MC) 404 is a controller that works closely with the L2 cache to provide a high-performance memory system. Although the number of channels may vary depending on the memory controller and the system employed, the particular MC 404 in the embodiment of FIG. 4 includes four data channels, illustrated as channels 0-3, in which a given data channel provides a 32-bit data path with 7-bit ECC (error correction code) for a total of 39 bits. MC 404 is typically coupled to a memory or memories, which may reside on the IC or may be located external to the IC chip. In the particular example shown in FIG. 4, MC 404 is coupled to an external memory 450 that operates as a main memory for the system 400.

A variety of memory devices may be controlled by MC 404, including synchronous dynamic random access memory (SDRAM) or double data rate (DDR) SDRAMS. Furthermore, pairs of channels may be ganged together to form up to two 64-bit channels with 8-bit ECC. In one embodiment, MC 404 may directly support up to eight standard, two-bank 184-pin DDR DIMMs (double inline memory modules) running at approximately 133 MHz and allows for performance to increase as the DIMMs support higher data rates. The peak memory bandwidth for a ganged 64-bit channel using standard (133 MHz clock) DIMMs may be 34 Gbps and may also increase up to 102 Gbps for a high-speed (400 MHz clock) design using all channels. A given 32-bit channel of MC 404 may support up to 512 MB of memory using 256-Mbit technology parts. As larger DRAMS become available the capacity may increase up to and beyond 2 GB with 512 Mbit parts and beyond 4 GB with 1 Gbit parts for a total of 16 GB across all four channels. Furthermore, special large memory mode may be utilized to increase the size of the memory further when MC 404 is used in conjunction with an external decoder.

The switch 410 may be utilized to switch and route data through either node controller (NC) 411 or packet manager (PM) 412. In the particular example system 400 of FIG. 4, three high-speed HT/SPI-4 ports (identified as Port 0, Port 1 and Port 2) coupled to respective HT/SPI-4 interfaces 420A-C. Interfaces 420A-C transmit and/or receive HT and/or SPI data using HT and/or SPI-4 protocol. Switch 410 receives data from interfaces 420A-C and internally segments the received SPI packets and HT transactions for routing to either NC 411 or PM 412. Similarly, when transmitting data, switch 410 receives SPI packet data or HT transactions from either NC 411 or PM 412 and routes it to one of the interfaces 420A-C. Node controller 411 transfers HT and inter-node coherency traffic between switch 410 and the ZB bus. PM 412 transfers packets to and from switch 410 and the ZB bus. Generally, the packets are transferred to and from PM 412 and the memory controlled by MC 404.

Although a variety of circuitry may implement PM 412, the example embodiment shown in FIG. 4 utilizes a packet manager which may be a direct memory access (DMA) engine that writes packets received from switch 410 to input queues in the main memory and reads packets from the output queues to the correct interface 420. The particular PM 412 may be comprised of two subsections referred to as input packet manager (PMI) and output packet manager (PMO). Both the PMI and PMO have descriptor engines and caches. These engines may prefetch descriptors and data from main memory as the software releases new descriptors for PM 412 to work on. PM 412 may have support for 32 input and 32 output queue descriptor rings. These queues may be assigned to virtual channels of the HT/SPI-4 interfaces 420 under software control. Additionally, the PMO may also handle scheduling packet flows from two or more output queues that may be sent to the same output virtual channel. Additionally, the PM may have TCP (transmission control protocol) and IP (internet protocol) checksum support for both ingress and egress packets.

NC 410 may perform a number of basic functions. For NC 410 of system 400, NC 410 may perform functions that include acting as a bridge between the ZB bus and HT/SPI-4 interfaces 420. Accesses originated on either side may be translated and sent on to the other. Support for HT configuration may also be supported. The second function may be to implement the distributed shared memory model with a CC-NUMA (cache coherent non-uniform memory access) protocol. Through a remote line directory (RLD), lines may be coherently sent to remote nodes while they are tracked. When lines need to be reclaimed, probes may be issued to retrieve or invalidate them. NC 410 may be responsible for generating any coherent commands to other nodes to complete another operation. Ordering of events may also be taken care of in NC 410.

The HT/SPI-4 (hyper-transport/SPI-4) interfaces 420A-C may comprise ports that are configured as interfaces that allow the system to communicate with other chips using either HT and/or SPI-4 (including SPI-4 phase 2) as the link protocol. In one embodiment there may be two, bidirectional interfaces on the chip, of 16-bits wide and independently capable of acting as an 8/16-bit HT and/or a SPI-4 link. The choice of whether to use a particular interface may be made statically at reset or alternatively by other techniques. The HT protocol may be compliant with version 1.02 of the Hyper-Transport specification. In addition, support may be present or added for the efficient transport of channelized packet data. Packet data herein being referred to the SPI-4 like traffic, which is based on message passing rather than read/write commands. This may be achieved by encapsulating the message packets into HT write commands to special addresses.

Bridge (BR1) 415 interfaces the ZB bus to various system interfaces, including a generic bus. Some examples of interfaces to the BR1 are noted in FIG. 4. In one embodiment for system 400, BR1 includes an interface to a generic bus which may be used to attach the boot ROM (read only memory) and/or a variety of simple peripherals. An SM bus interface may be employed to provide two serial configuration interfaces. The interfaces may provide hardware assistance for simple read and write of slave devices with the system as the bus master. The interface may include one or more DUARTs (dual asynchronous receiver/transmitter) which are serial ports that may provide full-duplex interfaces to a variety of serial devices. A general purpose input/output (GPIO) interface may have a number of pins that are available for general use as inputs, outputs or interrupt inputs. A PCI (peripheral component interconnect) interface may also be present to provide a connection to various PCI peripherals and components.

System controller and debug unit 419 may provide system level control, status and debugging features for the system 400. These functions may include: reset functions, including a full reset activity by an external reset pin; debug and monitoring functions including system performance counters, a ZB bus watcher of data transfers for I/O and memory controller or L2 cache ECC errors, a programmable trace cache which may conditionally trace ZB bus events and an address trap mechanism; communication and synchronous functions including gathering and distributing interrupts from the HT, PCI, DMA, and external I/O devices to the processors; and timing functions for watch dog timeouts and general purpose timing. SCD unit 419 may also include Ethernet interfaces (including gigabit Ethernet interface), JTAG (joint test action group) interface and a data mover using a multi-channel DMA engine to offload data movement and limited CRC (cyclic redundancy check) functions from the processors.

It is to be noted that only three HT/SPI-4 interfaces or ports are shown in system 400 of FIG. 4. However, the actual number of such ports may vary depending on the system employed. Interface 420 may be a high-speed port for the system and may be configured as either a 16-bit HT or a SPI-4 (including SPI-4 phase 2) interface. A variety of techniques may be employed to allow interface 420 to be a port for HT and SPI-4 data transfer. When in the HT mode, interface 420 may serve as either host or targets of an HT chain. In this configuration, the Rx and Tx for the particular interface 420 may be paired together to form a bidirectional HT link. The HT interface may be 1.2 Gbps/wire which results in a bandwidth of approximately 9.2 Gbps per HT link. For SPI-4 mode, the Rx and Tx interfaces may be considered independent. The interface 420 may be minimally clocked at a frequency to support 10 Gbps packet transfer rate (for example 600-800 Mbps/bit depending upon burst size and the desired link rate). Because the SPI-4 interface may be independent they can be oriented in a unidirectional flow. Note that in this configuration the ports may still be considered independent with several packet streams and flow control per interface. Lastly, interfaces 420 may be programmed such that one or more operate as SPI-4 and others in the HT mode. Thus, it is to be noted that the interfaces 420 may be configured in a variety of modes and functions depending on the particular technique of data transfer desired.

Also coupled to ZB bus 401 is a trace trigger/filter unit 430. A trace buffer is coupled to trace unit 430 to store the information captured by trace unit 430. Trace unit 430 and buffer 431 function equivalently to similar units 130, 131 in FIG. 1. Accordingly, since an instruction fetch to L1 cache in a particular processor is not visible on the ZB bus if there is a cache hit, the defeaturing of the cache hit signal causes a cache miss in the L1 Icache to force an instruction fetch to be made visible on ZB bus 401. By operation of the trace unit 430, these types of instruction fetches may be captured and stored in trace buffer 431.

In one test and debug technique, a tester is coupled to system 400 through the JTAG interface of SCD 419 to perform the debug operation by programming the defeature operation for the L1 Icache. If one or more of processors 402 utilize a defeature register, similar to register 301 of FIG. 3, then the tester may program the Icache defeature bit(s) in one or more of processors 402. The tester may also set the conditions (states) that the trace unit 430 will trigger on and filter only those actions on the ZB bus which are to be captured by trace unit 430. Because the trace unit can capture which CPU issues the instruction fetch, multiple CPUs on a chip may be simultaneously traced and there interactions investigated. The tester than may read out the captured information in trace buffer 431 through the JTAG interface of SCD 419. One such test technique to run an emulator to debug system 400 is illustrated in FIG. 5.

Figure 5:
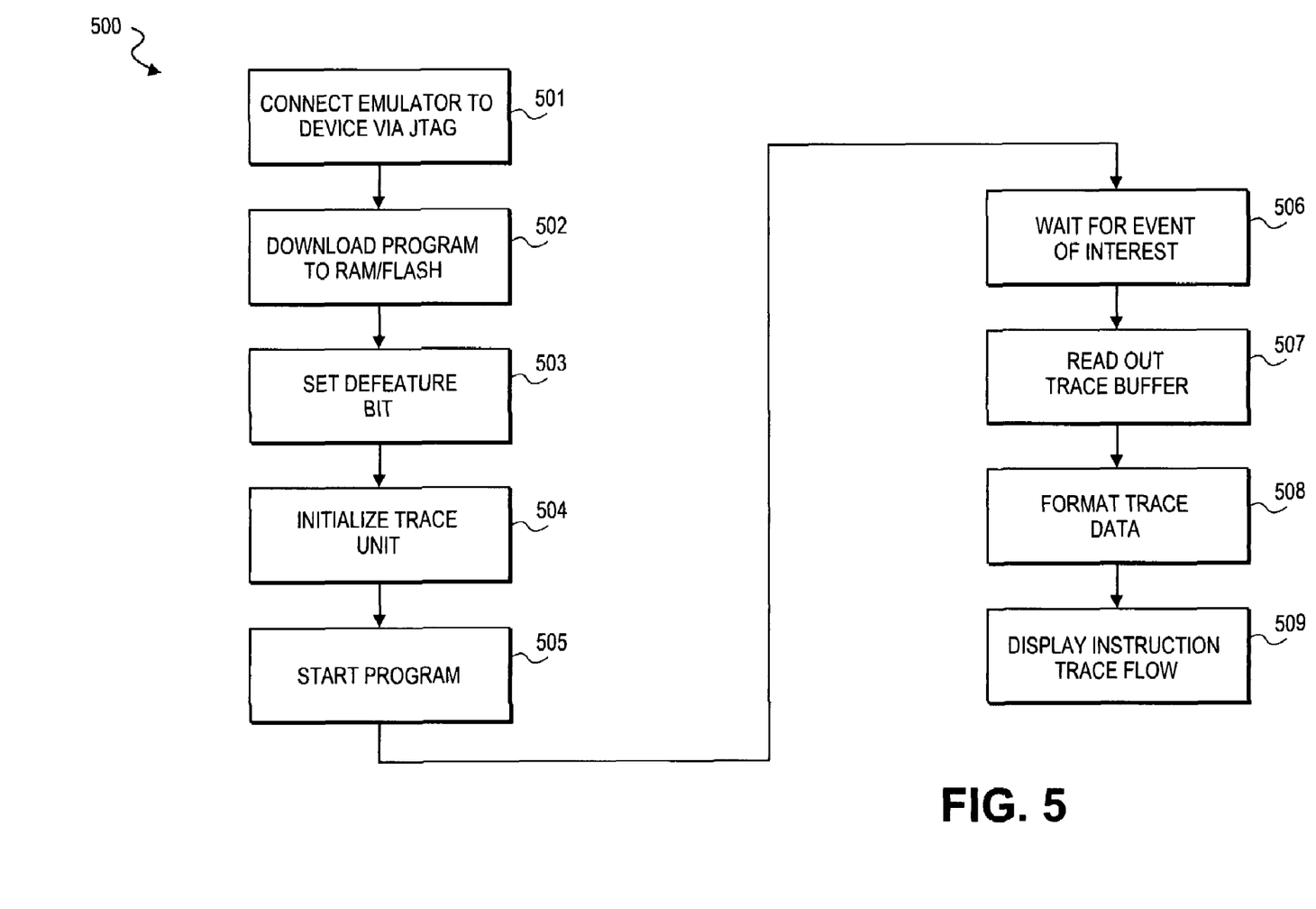
FIG. 5 is a process flow diagram illustrating one example technique for using an embodiment of the invention to perform tracing of the CPU's on the SOC of FIG. 4.

In FIG. 5, one example embodiment of a test method 500 is illustrated. An emulator is coupled to system 400 via JTAG interface of SCD 419 (block 501). Then, an emulator program is downloaded to memory 450 or to an equivalent memory, which may be flash memory (block 502). Next, the defeature bit is set in the processor(s) under test (block 503). Trace unit 430 is initialize to identify the state(s) or condition(s) to be traced (block 504). The stored emulation program is run to start the test (block 505). When the trace event occurs, the trace unit 430 captures the event on the ZB bus and stores the captured event in buffer 431 (block 506). At some desired point, trace buffer 507 is read out (block 507) and that data may be formatted (block 508) for appropriate display to show the traced instruction flow (block 509). When the defeature mode is active for the Icache, Icache hits are disabled and treated as misses by the processor, so that instruction fetches or program counters are visible on the system bus where these events may be traced.

A number of advantages are noted with the practice of the invention. The processor may operate at real time and at or near its normal operating frequency, since the tracing is performed on the system bus. Program flow tracing may be used to perform diagnostics by having a test unit run programs, or having the actual code being debugged run, on a processor at or near processor operating frequency. The traced instruction flow is read out to provide information for debugging the system. The location of the trace unit may be placed on a common point to perform various tracing functions and need not be limited to tracing just instructions. Having a common trace unit instead of a number of specialized trace units may save real estate on the chip. The invention allows those instructions which may hit in the Icache to be captured and traced, since the defeature mode disables the Icache hits.

Although a particular embodiment is described in reference to tracing instructions, the invention may be readily adapted to trace other information, including data on data lines. Furthermore, various defeature techniques may be implemented to make the potential cache hits visible to the trace unit. An added benefit may include the tracing of program flow in volatile and non-volatile memory, as well as that code that is contained in secondary cache. Therefore, equivalent techniques may be applied to L2 and L3 caches.

Thus, tracing instruction flow in an integrated processor is described.

I claim:

1. A method comprising:
   programming a single bit in a reserved register for a processor by use of op codes, wherein the register is used to defeature at least one function of a processor;
   gating the bit with a cache hit/miss signal from an instruction cache, in which during normal mode the register is programmed for the bit to have a first state to gate through the cache hit/miss signal from the instruction cache to an instruction fetch unit, but during a defeatured mode, the register is programmed for the bit to have a second state to gate the cache hit/miss signal for coupling to the instruction fetch unit as a cache miss, in order to defeature a cache hit as a cache miss to allow an instruction fetch to be made visible on a bus; and
   tracing the instruction fetch on the bus to monitor a cache hit transaction within an integrated circuit containing the processor, register and the instruction cache, in which the tracing is performed based on selectable test criteria.

2. The method of claim 1 wherein gating the bit when in the second state defeatures a cache hit from a Level 1 instruction cache.

3. The method of claim 2 wherein the tracing further includes triggering on selected transactions which are visible on the bus.

4. The method of claim 3 further comprising storing traced transactions in a buffer.

5. A method comprising:
   coupling a tester to an integrated circuit to perform a test on the integrated circuit, the integrated circuit containing a processor, a register and an instruction cache, wherein the register is a reserved register for a processor and programmed by op codes;
   loading a program to execute on the integrated circuit;
   programming a single bit in the reserved register of the processor, wherein the register is used to defeature at least one function of a processor;
   fetching instructions from an instruction fetch unit to run the program;
   gating the bit with a cache hit/miss signal from the instruction cache, in which during normal mode the register is programmed for the bit to have a first state to gate through the cache hit/miss signal from the instruction cache to the instruction fetch unit, but during a defeatured mode, the register is programmed for the bit to have a second state to gate the cache hit/miss signal for coupling to the instruction fetch unit as a cache miss, in order to defeature a cache hit as a cache miss to allow an instruction fetch to be made visible on a bus; and
   tracing the instruction fetches on the bus to monitor a cache hit transaction within the integrated circuit in order to debug the program executing on the integrated circuit, in which the tracing is performed based on selectable test criteria.

6. The method of claim 5 further comprising storing traced transactions in a trace buffer for subsequent retrieval.

7. The method of claim 6 wherein the tracing further includes triggering on selected transactions which are visible on the bus.

8. The method of claim 7 wherein coupling the tester and loading the program includes coupling an emulator to run an emulation program to test the integrated circuit.

9. An integrated circuit comprising:
   a processor to run instructions of a program;
   an instruction cache coupled to the processor to cache the instructions;
   a bus;
   a reserved register for a processor to store a single bit used to defeature a cache hit from the instruction cache, the register programmed for the bit to have a first state during normal mode and for the bit to have a second state during a defeatured mode, and the register to be programmed by use of op codes;
   a gating device coupled to gate the bit having the first state with a cache hit/miss signal from the instruction cache to gate through the cache hit/miss signal to an instruction fetch unit during the normal mode, but during the defeatured mode, the gating device to gate the bit having the second state with the cache hit/miss signal for coupling to the instruction fetch unit to generate a cache miss, in order to defeature a cache hit as a cache miss to allow an instruction fetch to be made visible on the bus; and
   a tracing unit coupled to the bus to trace instruction fetches on the bus to capture a cache hit transaction within the integrated circuit to be visible external to the integrated circuit in order to debug the program executing on the integrated circuit, in which the tracing by the tracing unit is performed based on selectable test criteria.

10. The integrated circuit of claim 9 wherein the register is programmable from an external testing device.

* * * * *